United States Patent
Bronlund

(10) Patent No.: US 6,709,152 B1
(45) Date of Patent: Mar. 23, 2004

(54) APPARATUS FOR CALIBRATION OF TEMPERATURE SENSORS

(76) Inventor: Ole Einar Bronlund, Ekornveien 13, 1404 Siggerud (NO)

( * ) Notice: Subject to any disclaimer, the term of this patent is extended or adjusted under 35 U.S.C. 154(b) by 0 days.

(21) Appl. No.: 10/048,127

(22) PCT Filed: Apr. 28, 2000

(86) PCT No.: PCT/NO00/00143

§ 371 (c)(1),
(2), (4) Date: Apr. 15, 2002

(87) PCT Pub. No.: WO00/66990

PCT Pub. Date: Nov. 9, 2000

(30) Foreign Application Priority Data

Apr. 29, 1999 (NO) .......................................... 19992065

(51) Int. Cl.⁷ .......................... G01K 15/00; G01K 19/00
(52) U.S. Cl. ............................... 374/3; 374/208; 374/1; 374/2
(58) Field of Search ................................ 374/1–3, 208, 374/210, 195, 201

(56) References Cited

U.S. PATENT DOCUMENTS

| | | | | |
|---|---|---|---|---|
| 3,348,408 A | * | 10/1967 | Engborg | 374/2 |
| 3,572,084 A | * | 3/1971 | Clifford et al. | 73/15 |
| 3,631,708 A | | 1/1972 | Ensor et al. | 374/2 |
| 3,946,612 A | * | 3/1976 | Sagi et al. | 73/356 |
| 4,075,882 A | * | 2/1978 | Waldron | 73/1 F |
| 4,145,911 A | * | 3/1979 | Jupa et al. | 73/1 F |
| 5,183,337 A | * | 2/1993 | Pompei | 374/2 |
| 5,678,923 A | * | 10/1997 | Germanow et al. | 374/1 |
| 6,193,411 B1 | * | 2/2001 | Chen | 374/2 |

FOREIGN PATENT DOCUMENTS

| | | |
|---|---|---|
| JP | 63248450 | 10/1988 |
| JP | 10115562 | 5/1998 |
| JP | 10160597 | 6/1998 |
| WO | WO 99/04231 | 1/1999 |

OTHER PUBLICATIONS

M.S.Scholl. Temperature calibration of an infrared radiation source. Applied Optics.vol. 19, No. 21.Nov. 1980.*

* cited by examiner

*Primary Examiner*—Gail Verbitsky
(74) *Attorney, Agent, or Firm*—Marshall, Gerstein & Borun LLP

(57) ABSTRACT

An apparatus for calibration of temperature sensors, comprising a cavity (2) for receiving a sensor (10) to be calibrated, a heat-transferring medium (5) for surrounding the sensor in the cavity, and a means for heating/cooling of the medium to a desired temperature. The cavity (2) receives at least one sensor-surrounding thin-walled calibrator body (3) which is made of a pliable material having a high thermal conductivity and which defines a volume (4) which is filled of a heat-transferring medium, the calibrator body (3) having an inner wall (8) defining at least a part of an inner opening (9) for receiving at least one sensor (10), and being arranged to be subjected to a pressure influence to bring the opening-defining wall (8) of the calibrator body into tight-fitting abutment against the sensor (10) or sensors.

21 Claims, 4 Drawing Sheets

FIG. 5
FIG. 6
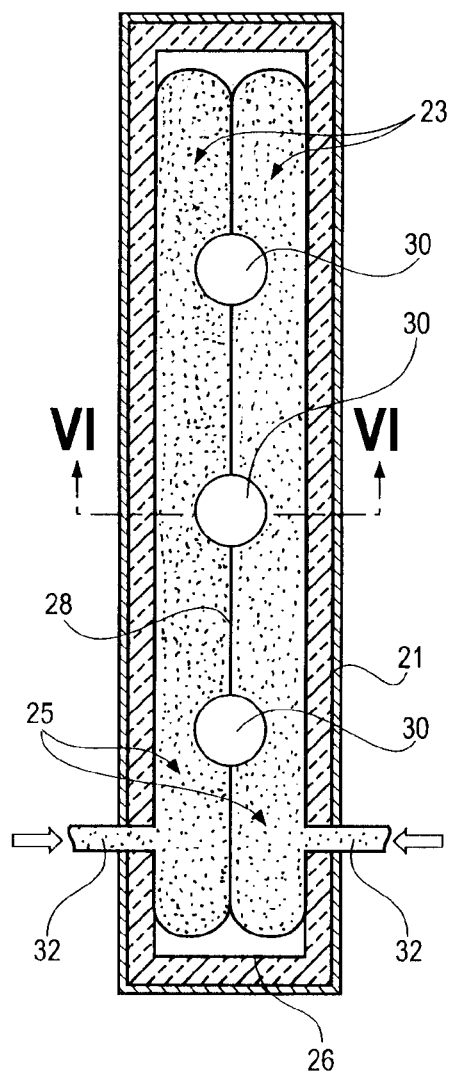
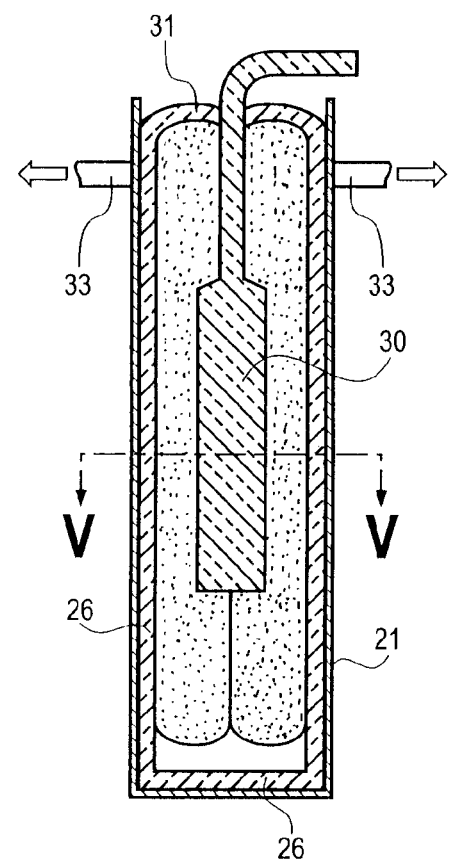

APPARATUS FOR CALIBRATION OF TEMPERATURE SENSORS

FIELD OF THE INVENTION

The invention relates to an apparatus for calibration of temperature sensors, comprising a cavity for receiving a sensor to be calibrated, a heat-transferring medium for surrounding the sensor in the cavity, and a means for heating/cooling of the medium to a desired temperature.

BACKGROUND OF THE INVENTION

As components and equipment age, and also are subjected to temperature changes and mechanical strains, the critical capacity will decrease. This is called drift. When this happens, one can no longer rely on previous capacity tests, and this may result in poorer quality in development and production. Since one can not prevent drift, one must instead detect and eliminate the effect thereof by means of calibration.

As known, calibration is to compare the capacity of an equipment with a known standard. The standards are maintained by national and international accredited calibration laboratories.

Today, there are imposed aggravated demands on the industry with respect to measuring accuracy and quality assurance (e.g., ISO 9000), and there is then required calibrating equipment which satisfies the requirement of today and complies with the new standards within temperature calibration.

The prior art traditionally includes two principal types of calibrators, namely liquid bath calibrators and dry block calibrators.

Liquid Bath Calibrator

In the liquid bath calibrator, the sensor to be calibrated is lowered into a liquid during forced agitation at a given reference temperature. A calibrator of this type has advantages and drawbacks which may be summarized as follows:

Advantages:
- A good and defined heat transfer/temperature difference between liquid and reference thermometer and between liquid and sensor/thermometer to be calibrated
- A liquid during agitation has a smooth temperature distribution and therefore is both control-technically advantageous and able to calibrate sensors with large differences in length Drawbacks:
- A liquid possibly will have to be changed for different temperature ranges
- A liquid may result in spill and damages, especially at extreme temperatures
- The temperature sensor has to be dried, and possibly cleaned after use
- A liquid is a drawback in case of transport, and in portable solutions is disadvantageous with the respect to handling.

Dry Block Calibrator

In the dry block calibrator, the sensor is placed in a bore which is then air-filled. The ambient temperature of the bore is regulated to a temperature which is as close as possible to the desired reference temperature. Drawbacks and advantages of this type of calibrator may be summarized as follows:

Advantages:
- Simple and cleanly handling
- Well suited for portable devices and therefore for in situ calibration Drawbacks:
- Heat transfer air/sensor with natural convection is slow and difficult to define physically, and the percentage of radiation is obscure so that the temperature difference between reference and sensor is indistinctly defined in time
- Sensitive to varying thermal capacity in the temperature sensors to be calibrated
- Exacting optimization between geometry and mass in the block in order to achieve a good temperature distribution, a uniform temperature in the bore and small masses in order to change the temperature picture quickly
- Requires a good cleaning of block and bore for maintaining the thermal properties influencing the accuracy
- Control-technically exacting
- Difficult to achieve the same temperature in the entire depth of the bore
- Greater measuring uncertainty than for the liquid bath calibrator An apparatus of the introductorily stated type is known e.g. from the international patent application No. PCT/NO98/00218. This calibrator possesses most of the advantages of both of the above-mentioned principal types, but still has the drawbacks of a large mass and weight in the calibrator block, and with the liquid-filled liner it has the same cleaning problems as the liquid bath calibrator.

SUMMARY OF THE INVENTION

It is a principal object of the invention to provide a calibrating apparatus which combines the high accuracy of the liquid bath calibrator with the simplicity and environmental advantages (cleanliness) in use of the dry block calibrator.

A more particular object of the invention is to provide a calibrating apparatus with which there is obtained a physically well definable, desired reference temperature and a quick regulation thereof Further objects of the invention is to provide such an apparatus allowing
- achievement of the smallest possible weight and smallest possible dimensions for the entire instrument
- achievement of the lowest possible energy demand
- minimized risk for personal injuries because of contact with very hot or cold liquids or components
- coverage of a large temperature range with the smallest possible change of construction and instrument variants.

The above-mentioned objects are achieved with a calibrating apparatus of the introductorily stated type which, according to the invention, is characterized in that the cavity receives at least one sensor-surrounding thin-walled calibrator body which is made of a pliable material having a high thermal conductivity and which defines a volume which is filled of the heat-transferring medium, the calibrator body having an inner wall defining at least a part of an inner opening for receiving at least one sensor, and being arranged to be subjected to a pressure influence to bring the opening-defining wall of the calibrator body into tight-fitting abutment against the sensor or sensors.

The heat-transferring medium in the apparatus may be a liquid or a gas. The material of the calibrator body advantageously may be elastic.

An advantageous embodiment of the apparatus is characterized in that the side of the calibrator body wall facing the heat-transferring medium, has a surface-increasing structure ensuring maximum heat transfer, whereas the side of the wall facing a sensor body has a structure ensuring an optimum contact surface and heat transfer.

The pressure of the gas or liquid filling is adjusted such that the filling may get an underpressure or no pressure difference relative to the surroundings, so that a sufficient opening is obtained when introducing the temperature sensor, whereas an overpressure is applied during the calibration to secure that the calibrator body obtains a maximum contact with the sensor. The pressure of the liquid or gas filling may also be adjusted such that it may facilitate the introduction of the sensor with complete or partial contact of the calibrator bodies.

The overpressure in the calibrator body or calibrator bodies may be applied either in that the liquid or gas filling is supplied with an overpressure directly, in that adjacent or surrounding bodies exert an external pressure on the calibrator body, or in that an external pressure is applied by means of other mechanical devices.

The liquid or gas filling is subjected to a forced through-flow and passes a region outside the calibrator bodies where heat energy is either supplied or carried off in order to obtain the desired reference temperature.

One or more temperature sensors is/are placed at appropriate places in the liquid or gas flow as transmitters to a control circuit controlling supply or removal of heat energy, possibly together with control of the flow rate, in order to obtain the desired reference temperature in the surrounding calibrator body or bodies.

In order to avoid an undesired supply or removal of heat energy, all liquid or gas-filled parts are provided with a suitable heat insulation.

The apparatus according to the invention allows a compact construction with smaller dimensions and a lower weight than previously known solutions, and it will probably be able to be developed to such a low energy consumption that it may be equipped with a portable current source of its own. The invention thus will be particularly well suited for portable temperature calibrators.

BRIEF DESCRIPTION OF THE DRAWINGS

The invention will be further described below in connection with exemplary embodiments which are schematically shown in the drawings, wherein

FIGS. 5 and 6 show corresponding sectional views to those in FIGS. 3 and 4, of the apparatus in a second state.

DETAILED DESCRIPTION OF THE INVENTION

Figure 1A:
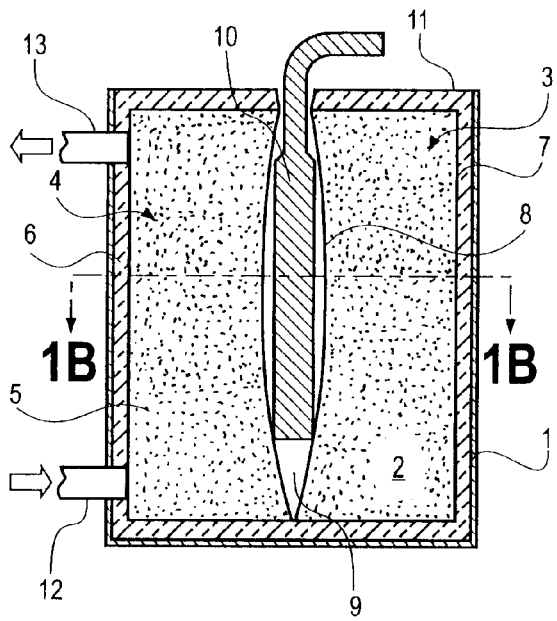
FIG. 1A shows a longitudinal section of a first embodiment of the apparatus according to the invention in a first state, along the line 1A—1A in FIG. 1B.

The embodiment of the apparatus according to the invention shown in FIG. 1 and 2 comprises a circularly cylindrical container constituting a jacket 1 of a suitable, for example metallic material. The jacket defines a cavity 2 in which there is placed a thin-walled calibrator body 3 which is made of a suitable elastic material having a high thermal conductivity, e.g. a rubber material which is suitable for use within the relevant temperature limits. The calibrator body 3 defines a volume 4 receiving the relevant heat-transferring medium 5 which may be a liquid or a gas.

A heat insulating material 6 is placed between the calibrator body 3 and the jacket 1. The calibrator body 3 has an outer wall 7 resting against the insulating material 6, and an inner wall 8 defining a central opening 9 extending along the longitudinal axis of the container I and being adapted to receive a temperature sensor 10 to be calibrated. At the upper side of the calibrator body 3, where the opening 9 emerges and the temperature sensor 10 is to be introduced, there is applied an elastic, heat-insulating material 11.

As shown in the Figures, the calibrator body 3 is provided with an inlet 12 and an outlet 13 for connection to a circulation system, as further described in connection with FIG. 7. In addition to the fact that the circulation system provides for forced through-flow of the medium 5 through the calibrator body 3, it is also provided with means for producing an overpressure, and possibly also an underpressure, in the medium in the calibrator body 3.

The placing of the inlets and outlets shown in the drawings, is only meant as illustrating examples. In the embodiments in FIGS. 1 and 2, they may for example be placed tangentially, in order to produce a vortex-like flow in the container. Generally, one will aim at such a placement and such a structural design that a good and uniform distribution of the through-flow is obtained, to thereby obtain minimum temperature gradients.

Figure 1B:
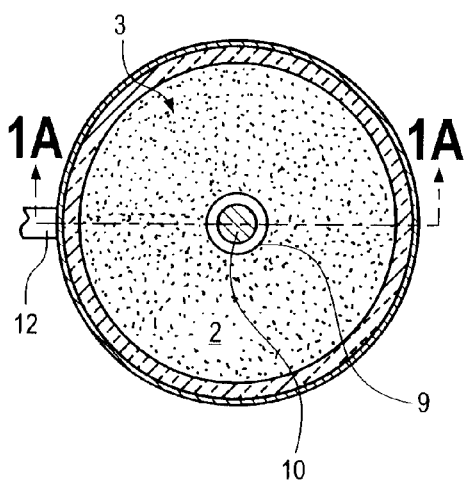
FIG. 1B shows a cross-section along the line 1B—1B in FIG. 1A.
Figure 2A:
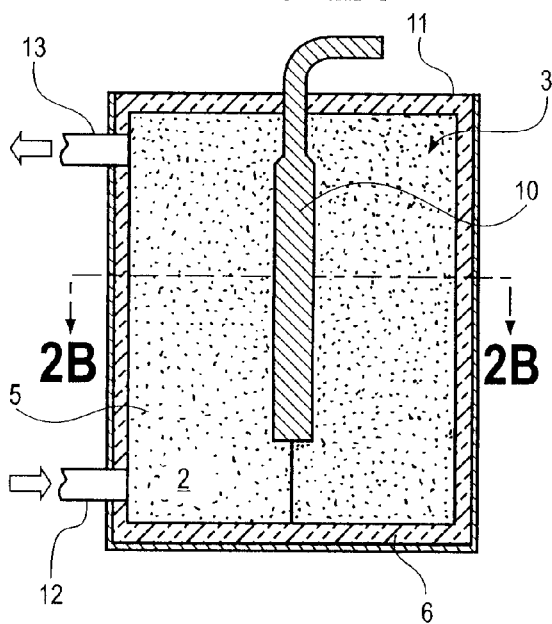
FIG. 2A and 2B show corresponding longitudinal and cross-sectional views to those shown in FIGS. 1A and 1B, but of the apparatus in a second state.
Figure 2B:
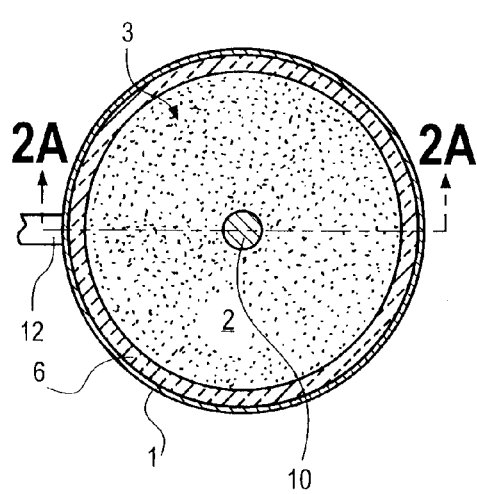

In FIGS. 1A and 1B, the apparatus is shown in a state wherein there is an underpressure in the medium 5. The inner wall 8 of the calibrator body then takes a position wherein it forms a suitable opening 9 for introduction of the temperature sensor 10 to be calibrated. In the condition in FIGS. 2A and 2B, the sensor 10 has been introduced into the opening 9 and the medium is subjected to an overpressure, so that the inner wall 8 of the calibrator body is brought into tight-fitting abutment against the sensor 10. Thus, there is obtained a complete or approximately complete contact between the calibrator body and the sensor, the elastic inner wall 8 adapting itself to the shape of the sensor, so that an optimum heat transfer is obtained.

Figure 3:
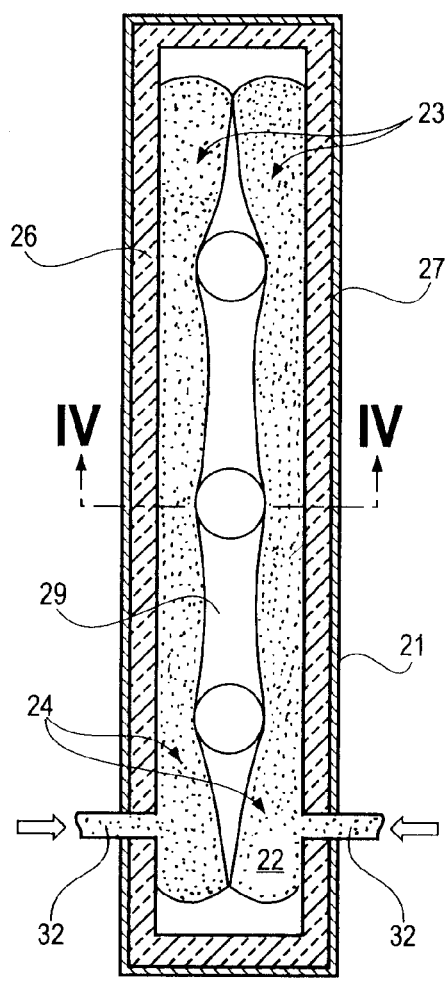
FIG. 3 shows a cross-section of a second embodiment of an apparatus according to the invention in a fist state, along the line III—III in FIG. 4.

FIGS. 3–6 show a second embodiment of the apparatus according to the invention. In this embodiment, the cavity-defining jacket 21 forms an upwardly open container having a rectangular cross-section as shown in FIGS. 3 and 5, and having a cavity 22 in which there are placed two thin-walled, essentially equal calibrator bodies 23 which may be formed from an elastic material, or possibly from a suitably deformable, pliable, but inelastic material. Each calibrator body 23 defines a volume 24 receiving the relevant heat-transferring medium 25 (gas or liquid).

Between the calibrator bodies 23 and the side walls and bottom of the container there is placed a heat-insulating material 26. Each calibrator body 23 has an outer wall 27 resting against the insulating material 26, and an inner wall 28. The inner walls 28 define a slot-shaped opening 29 extending centrally between a pair of opposite side walls of the container and being adapted for introduction and receipt of two or more sensors to be calibrated, in the illustrated case three sensors 30. One of these sensors possibly may be an extra reference sensor which will thus be subjected to a temperature and a thermal condition which is so similar to the condition of the sensor or sensors to be calibrated that it will constitute a very accurate calibration reference.

As in the first embodiment, the insulating material 26 between the calibrator bodies 23 and the side walls and bottom of the container is a solid material. At the upper side of the calibrator bodies 23, where the slot 29 emerges and the sensors 30 are to be introduced, there is applied an insulation 31 of an elastic material.

In a similar manner as in the first embodiment, each calibrator body 23 further is provided with an inlet 32 and an outlet 33 for connection to a circulation system which provides for a forced appropriate through-flow of the medium 25 through the calibrator bodies 23, and for the provision of an overpressure in the medium when this is desired.

Figure 4:
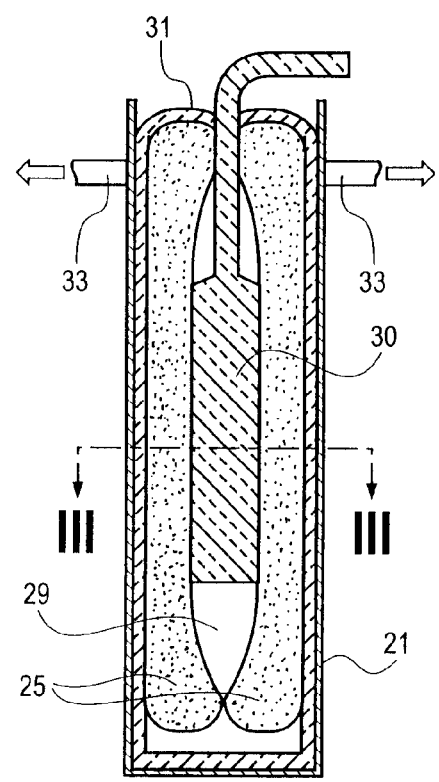
FIG. 4 shows a sectional view along the line IV—IV in FIG. 3.

In FIGS. 3 and 4, the apparatus is shown in a first state in which there is zero overpressure in the medium 25. The inner walls 28 of the calibrator bodies then take a position in which the slot 29 is open for introduction of the temperature sensors 30. In FIGS. 5 and 6 the apparatus is shown in a second state in which the medium in the calibrator bodies is subjected to an overpressure, so that the inner walls 28 partly rest against each other and partly are brought into a tight-fitting abutment against the sensors 30, the walls having adapted themselves to the shape of the sensors.

Figure 7:
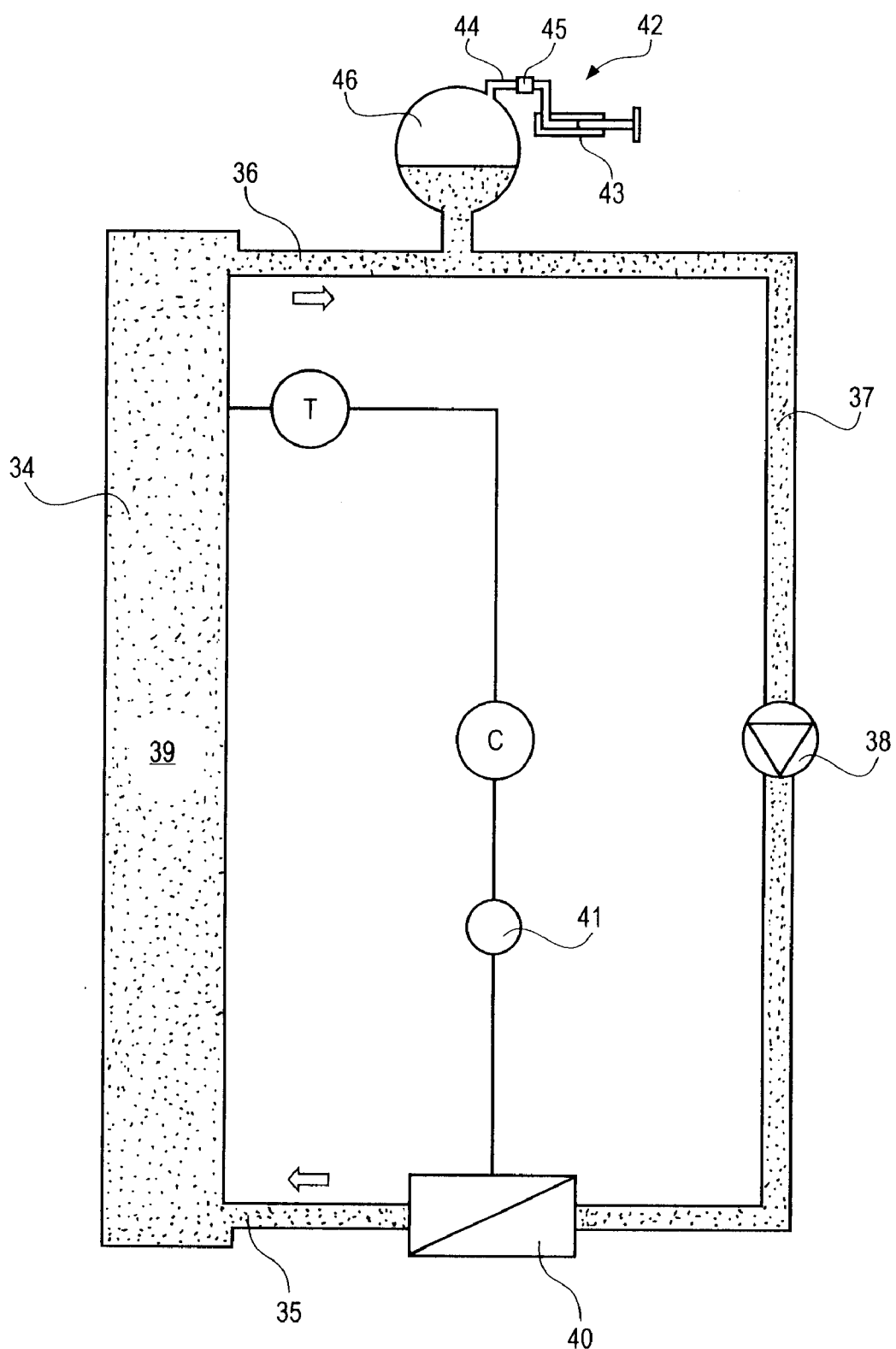
FIG. 7 is a schematic drawing showing a calibrator body which is connected to a circulation system having a regulating circuit for regulating the temperature of the heat-transferring medium.

FIG. 7 shows a calibrator body 34 which is connected to a circulation system comprising a regulating circuit for regulating the temperature of the medium, and possibly also the through-flow velocity thereof through the calibrator body.

Thus, the calibrator body 34 has an inlet 35 and an outlet 36 which are connected to a pipeline 37 having a pump 38 for circulation of the medium 39. In the pipeline 37 there is further connected a heat-regulating unit 40 controlled by a regulating circuit symbolically designated by "C". The regulating circuit supplies control signals from a number of temperature sensors "T" placed at appropriate places in the medium flow. The regulating circuit regulates supply or removal of heat energy via the unit 40 by means of a control device 41, and it also controls the speed of the pump 38 and thereby the flow velocity of the medium, thereby to achieve the desired reference temperature of the medium in the calibrator body 34.

To the pipeline 37 there is also connected a pressure-and volume-regulating device 42 for adjusting the pressure in the medium 39, and thereby the volume of the calibrator body. This device is shown to comprise a pump 43 connected to a line 44 which contains a valve 45 and is connected to the pipeline 37 through a hydraulic condenser 46, the medium in this embodiment of the apparatus being presupposed to be a liquid.

When using a gas instead of a liquid as the heat-transferring medium, the hydraulic condenser 46 will be unnecessary. The use of a gas may have advantages in case of extremely high or low temperatures.

What is claimed is:

1. An apparatus for calibration of temperature sensors, comprising in combination a cavity (2; 22) for receiving a sensor (10; 30) to be calibrated, a heat-transferring medium (5; 25) for surrounding the sensor in said cavity, a means (40) for heating/cooling of said medium to a desired temperature, said cavity (2; 22) adapted to receive at least one sensor-surrounding thin-walled calibrator body (3; 23) which is made of a heat-conductive pliable material having a high thermal conductivity and which defines a volume (4; 24) which is filled with said heat-transferring medium, said calibrator body (3;23) having an inner wall (8; 28) defining at least a part of an inner opening (9; 29) for receiving at least one sensor (10; 30), and being under a pressure influence to bring said opening-defining wall (8; 28) of said calibrator body into tight-fitting abutment against said at least one sensor (10).

2. An apparatus according to claim 1, wherein said at least one calibrator body (3; 23; 34) is connected to a pressure- and volume-regulating device (42) arranged to place said heat-transferring medium (5; 25; 39) under an overpressure, thereby to bring said calibrator body into tight-fitting abutment against the sensor (10) or sensors (30).

3. An apparatus according to claim 1 or 2, wherein said heat-transferring medium (5; 25) is one of a liquid or a gas.

4. An apparatus according to claim 1, wherein said at least one calibrator body (3) is surrounded by a heat-insulating material (6; 26) which is placed in a cavity-defining jacket (1; 21).

5. An apparatus according to claim 4, wherein said jacket (1) forms an essentially circularly cylindrical container in which there is placed a correspondingly shaped calibrator body (3) defining a central opening (9) extending along the longitudinal axis of said container and being adapted to receive a sensor (10) to be calibrated.

6. An apparatus according to claim 4, wherein said jacket (21) forms a container having an essentially rectangular cross-section and in which there is placed at least one calibrator body (23) defining a slot-shaped opening (29) extending centrally between opposite sides of said container and being adapted to receive two or more sensors (30) to be calibrated.

7. An apparatus according to claim 1, wherein said material of said calibrator body (3) is elastic.

8. An apparatus according to claim 1, wherein the side of said inner wall (8; 28) of said calibrator body (3) facing said heat-transferring medium (5; 25) has a surface-increasing structure ensuring maximum heat transfer, whereas said side of said inner wall (8; 28) facing a sensor body (10; 30) has a structure ensuring optimum contact surface and heat transfer.

9. An apparatus according to claim 8, wherein said surface-increasing structure consists of one of ribs and unevennesses.

10. An apparatus according to claim 1, wherein said at least one calibrator body is provided with an inlet (35) and an outlet (36) for connection to a circulation system (37) having a pump (38) for forced circulation of said heat-transferring medium (39) through said calibrator body (34).

11. An apparatus according to claim 10, wherein said means (40) for heating/cooling of said heat-transferring medium (39) is connected in said circulation system (37) and is controlled by a regulating circuit (C) supplying control signals from a number of temperature sensors (T) placed in the medium flow, and which also is arranged to influence said pump (38) to adjust the flow velocity.

12. An apparatus for calibration of temperature sensors, comprising in combination a cavity (2; 22) for receiving a sensor (10; 30) to be calibrated, a heat-transferring medium (5; 25) for surrounding the sensor in said cavity, a means

(40) for heating/cooling of said medium to a desired temperature, said cavity (2; 22) adapted to receive at least one sensor-surrounding thin-walled calibrator body (3; 23) which is made of a heat-conductive pliable material which defines a volume (4; 24) which is filled with said heat-transferring medium, said calibrator body (3; 23) having an inner wall (8; 28) defining at least a part of an inner opening (9; 29) for receiving at least one sensor (10; 30), and being arranged to be subjected to a pressure influence to bring said opening-defining wall (8; 28) of said calibrator body into tight-fitting abutment against said at least one sensor (10), wherein said at least one calibrator body (3; 23; 34) is connected to a pressure-and volume-regulating device (42) arranged to place said heat-transferring medium (5; 25; 39) under an overpressure, thereby to bring said calibrator body into tight-fitting abutment against the sensor (10) or sensors (30).

13. An apparatus according to claim 12, wherein said heat-transferring medium (5; 25) is one of a liquid and a gas.

14. An apparatus according to claim 12, wherein said at least one calibrator body (3) is surrounded by a heat-insulating material (6; 26) which is placed in a cavity-defining jacket (1; 21).

15. An apparatus according to claim 14, wherein said jacket (1) forms an essentially circularly cylindrical container in which there is placed a correspondingly shaped calibrator body (3) defining a central opening (9) extending along the longitudinal axis of said container and being adapted to receive a sensor (10) to be calibrated.

16. An apparatus according to claim 14, wherein said jacket (21) forms a container having an essentially rectangular cross-section and in which there is placed at least one calibrator body (23) defining a slot-shaped opening (29) extending centrally between opposite sides of said container and being adapted to receive two or more sensors (30) to be calibrated.

17. An apparatus according to claim 12, wherein said material of said calibrator body (3) is elastic.

18. An apparatus according to claim 12, wherein the side of said inner wall (8; 28) of said calibrator body (3) facing said heat-transferring medium (5; 25) has a surface-increasing structure ensuring maximum heat transfer, whereas said side of said inner wall (8; 28) facing a sensor body (10; 30) has a structure ensuring optimum contact surface and heat transfer.

19. An apparatus according to claim 18, wherein said surface-increasing structure consists of one of ribs and unevennesses.

20. An apparatus for calibration of temperature sensors, comprising in combination a cavity (2; 22) for receiving a sensor (10; 30) to be calibrated, a heat-transferring medium (5; 25) for surrounding the sensor in said cavity, a means (40) for heating/cooling of said medium to a desired temperature, said cavity (2; 22) adapted to receive at least one sensor-surrounding thin-walled calibrator body (3; 23) which is made of a heat-conductive pliable material which defines a volume (4; 24) which is filled with said heat-transferring medium, said calibrator body (3; 23) having an inner wall (8; 28) defining at least a part of an inner opening (9; 29) for receiving at least one sensor (10; 30), and being arranged to be subjected to a pressure influence to bring said opening-defining wall (8; 28) of said calibrator body into tight-fitting abutment against said at least one sensor (10), wherein said at least one calibrator body is provided with an inlet (35) and an outlet (36) for connection to a circulation system (37) having a pump (38) for forced circulation of said heat-transferring medium (39) through said calibrator body (34).

21. An apparatus according to claim 20, wherein said means (40) for heating/cooling of said heat-transferring medium (39) is connected in said circulation system (37) and is controlled by a regulating circuit (C) supplying control signals from a number of temperature sensors (T) placed in the medium flow, and which also is arranged to influence said pump (38) to adjust the flow velocity.

* * * * *

UNITED STATES PATENT AND TRADEMARK OFFICE
CERTIFICATE OF CORRECTION

PATENT NO. : 6,709,152 B2
DATED : March 23, 2004
INVENTOR(S) : Ole Einar Bronlund It is certified that error appears in the above-identified patent and that said Letters Patent is hereby corrected as shown below:

Column 6,
Lines 6-7, replace "material having a high thermal conductivity and which defines ..." with -- material which defines --

Signed and Sealed this

Twenty-ninth Day of June, 2004

JON W. DUDAS
*Acting Director of the United States Patent and Trademark Office*